April 5, 1932.  L. A. PERRY  1,852,332
MOLD FOR MAKING VITREOUS CHINA ARTICLES
Filed May 28, 1928   2 Sheets-Sheet 1
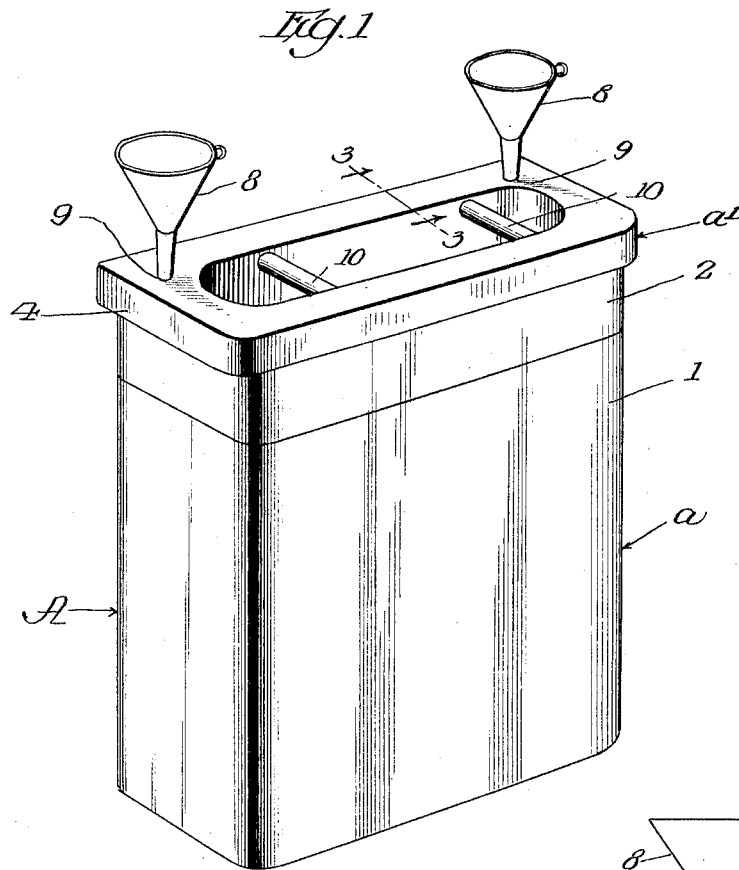
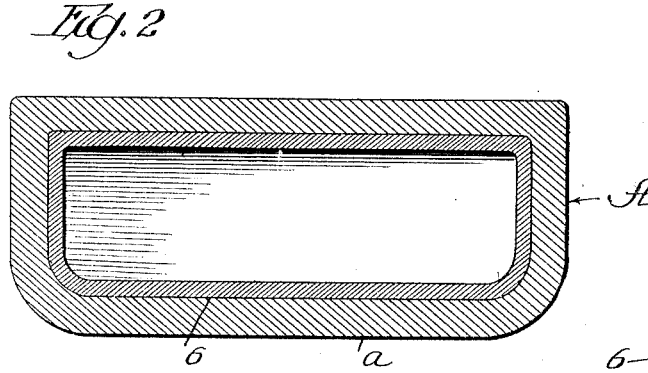
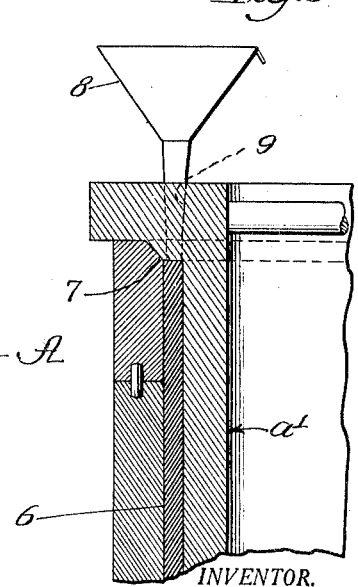
INVENTOR.
Lindon A. Perry,
BY
ATTORNEY

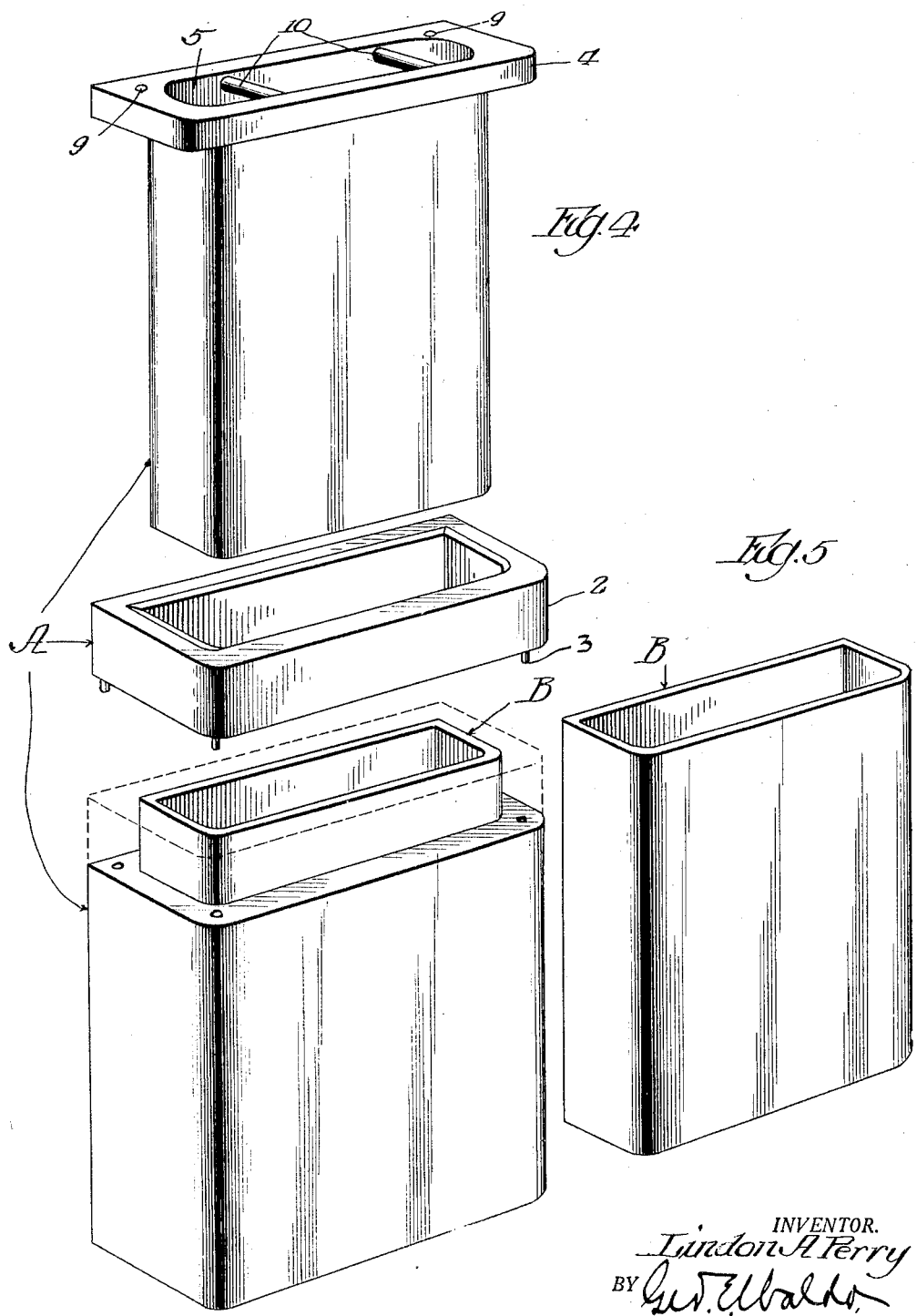

Patented Apr. 5, 1932

1,852,332

UNITED STATES PATENT OFFICE

LINDON A. PERRY, OF WORTH, ILLINOIS, ASSIGNOR TO CHICAGO POTTERY COMPANY, OF WILMINGTON, DELAWARE, A CORPORATION OF DELAWARE

MOLD FOR MAKING VITREOUS CHINA ARTICLES

Application filed May 28, 1928. Serial No. 281,271.

This invention relates to molds for making vitreous china articles, particularly flushing tanks for toilets.

As is generally well known, vitreous china consists of clay, flint and feldspar, the flint and feldspar being reduced to the form of an impalpable powder and thoroughly mixed with the clay and water to form what is known as "slip", which is poured into molds made of suitable absorbent material, usually plaster of Paris, which consists of a hollow outer mold member and core adapted to be supported within the outer mold member, the inner surface of the outer mold member conforming in shape and size to the exterior surface of the finished article and the surface of the mold core conforming in size and shape to the inner surface of the finished article. Said outer mold member and core are so proportioned that, as assembled for use, their opposed surfaces will define a cavity which conforms in shape and substantially in size to the shape and size of the finished article, said space being sufficiently wider than the designed thickness of the finished article to provide for normal shrinkage in drying and firing.

In molding articles of vitreous china, slip is poured into the molds until they are full—funnels usually being used for this purpose—the affinity of the water for the plaster of Pairs or other absorbent material of which the molds are made, causing the mold to absorb the liquid content of the slip and thereby to deposit the pulverulent material held in suspension therein on the walls of the mold cavity in the form of continuous layers of substantially uniform thickness.

As long as the mold is maintained full of slip, this absorption and deposit process will continue until, in the manufacture of articles, such as flushing tanks, the entire mold cavity or space defined by the opposed walls of the molded section is filled with the deposited pulverulent material, thus forming the solid walls of the articles to be molded. To provide for the deposit or building up of the solid walls of the articles so that they will fill the mold cavity, the funnels used for supplying slip to the molds are maintained full of slip during a period of time which experience has shown to be necessary to produce walls of desired thickness. Usually slip is poured into the funnels at intervals so as to keep the level of the slip therein somewhat above the level of the highest point of the mold cavity. In the case of vitreous china flushing tanks, walls of desired thickness will be deposited in about one hour, after which the mold is permitted to stand until the deposited material has set—say for about five hours,—after which the mold is removed from the article, which is then permitted to season until in condition for firing.

Heretofore, so far as I am aware, the common practice in molding vitreous china flushing tanks and other similar articles, has been to use a mold consisting of a hollow outer mold member, the interior of which conforms to the outer surface of the flushing tank or other article to be molded, and a core adapted to be supported within the outer hollow mold member with its side and bottom walls in spaced relation to the opposed walls of the said outer mold member, said mold member and core being proportioned to provide a mold cavity of a width corresponding to desired thickness of the walls of the finished article.

Heretofore, also, the mold core has been formed with a flange on its upper end which is adapted to extend over and rest upon the top of the outer mold member, means, as dowel pins, being provided for properly positioning the walls of the mold core relative to those of the outer mold member.

In using said molds, the common practice has been to mold the flushing tanks or other articles with the mold in upright position, holes being provided in the flange at the upper end of the mold core, adapted to receive funnels through which the slip is supplied to the mold cavity, the level of the slip in said funnels being maintained at a point somewhat above the highest point of the mold, by adding slip at intervals to replace water withdrawn from the slip through capillary action of the absorbent mold members.

After the mold cavity is filled with deposited material—that is after the walls of the article to be molded are fully formed—the funnels are removed and the mold permitted to stand until the deposited material contained therein sets, say for about one hour, after which the core of the mold is withdrawn, the mold turned into upside down position and the outer mold member lifted bodily from the molded article which is then permitted to stand until seasoned for firing.

This method of operation is very objectionable on account of the labor and expense involved in removing the mold from the molded article, the services of two men being required in removing the core, turning the mold upside down, and lifting the outer mold member off from the molded article.

The object of the present invention is to overcome this objectionable feature by providing a mold so constructed and arranged that the entire molding operation, including the removal of the finished article from the mold, may be performed by a single operator and in a shorter time than has heretofore been possible with present molds.

To effect the object of the invention, a mold embodying my invention and improvements comprises a hollow outer member the sides and bottom of which are closed, and a core adapted to be supported within said hollow mold member, said outer mold member and core being so proportioned that opposed walls thereof will be spaced apart, thus forming the mold cavity, said outer mold member comprising a main portion and a separate upper rim portion, the relation being such that when the mold core and the upper rim portion of the outer mold member are removed, the upper end of the molded article will be exposed so that it may conveniently be grasped and withdrawn from the main body portion of the mold.

My invention also comprises the various other features, combinations of features and details of construction hereinafter described and claimed.

In the accompanying drawings in which my invention is fully illustrated—

Figure 1 is an isometric view of a mold embodying my invention and improvements as it will appear when assembled for use.

Figure 2 is a horizontal sectional view on the line 2—2 of Figure 1 with the core of the mold removed.

Figure 3 is an enlarged fragmentary, vertical sectional view taken substantially on the line 3—3 of Fig. 1.

Figure 4 is an isometric view, substantially similar to Fig. 1, showing the mold core and the upper rim section of the outer mold member removed so as to expose the upper end of the molded article to provide for conveniently grasping it to withdraw it from the lower portion of the outer mold member, the mold core and upper rim section of the outer mold member being separately shown above said lower portion of the outer mold member; and Figure 5 is an isometric view of the molded article removed from the outer mold section.

In accordance with usual practice, my improved mold will be made of suitable absorbent material, preferably plaster of Paris.

Describing the invention with particular reference to the drawings, A designates the mold as a whole, and B a flushing tank such as the mold A is particularly designed and adapted for making, but which may exemplify a large variety of articles.

In what I now consider the preferable embodiment of my invention, the mold A consists of an outer mold member, designated as a whole a, and a core, designated as a whole a'.

As shown, the outer mold member a comprises a lower base portion 1 and an upper, separately removable portion 2, the designed operative position of which relative to the lower portion 1 of said outer mold member is defined by suitable means, as by dowel pins 3.

The outer mold member a is hollow and the mold core a' is adapted to be supported within the same with the walls thereof in spaced relation to the opposed walls of the outer mold member a. Simple means for this purpose consists of a flange 4 formed on the upper end of the mold core a' which is adapted to project outwardly and to rest upon the top of the outer mold member a, being shown as resting directly upon the top of the upper separately removable rim portion 2 thereon.

To reduce the weight of the mold core a', it is made hollow, as shown at 5, Fig. 4, the walls of the outer mold section a and of the mold core a' being made sufficiently thick to insure contemplated capillary action and absorption. Also, the outer mold member a and the mold core a' are so proportioned that a space 6, see particularly Fig. 3, will be provided between the opposed walls of said outer mold member and mold core, corresponding to the contemplated thickness of the walls of the flushing tank B or other article to be molded.

As shown, also, the position of the outer mold member a and the mold core a' relative to each other, when the mold is assembled, is defined by engaging beveled surfaces formed at the underside of the flange 4 on the mold core and on the upper separately removable rim portion 2 of the outer mold member, as best shown at 7, Fig. 3.

In use, the slip for forming the flushing tank B or other article to be molded, is poured into the space 6 formed between the walls of the outer mold member a and the mold core a' until the mold cavity is full, funnels shown at 8, being commonly used for this purpose, the spouts of said funnels being inserted into holes 9 formed in the flange 4 on the upper end of the mold core in line with said space 6.

Due to the affinity of the liquid portion of the slip for the plaster of Paris or other absorbent material of which the mold A is made, the water contained in the slip will be absorbed by the walls of the mold, thereby causing the pulverulent solid material held in suspension therein to be deposited upon the walls of the mold cavity, in a familiar manner, such absorption and deposit continuing until the space 6 or mold cavity is completely filled.

In the molding process, the water withdrawn from the slip through absorption thereof by the walls of the mold, is replaced by pouring slip into the funnels 8 from time to time so as to maintain the slip contained in said funnels at a level somewhat above the top of the mold.

The length of time required for depositing a given article will depend upon the thickness of the walls thereof, the time for depositing a flushing tank having walls of usual thickness being about one hour.

After the article has been molded, the mold is permitted to stand until the deposited raw material forming the article sets—say about five hours. After the article has set, the mold core $a'$ is withdrawn and the upper rim section 2 of the outer mold member $a$ is removed, so that the upper end of the flushing tank or other article B will project above the lower portion 1 of the outer mold member so that it may conveniently be grasped and lifted from the lower portion 1 of said outer mold member and deposited on a suitable rack or bench where it is permitted to remain until it is seasoned and ready for firing.

To provide for conveniently handling the mold core $a'$, particularly to withdraw it after the molding operation has been completed and the article has become set, the mold core $a'$ is provided with handles consisting, as shown, of rods 10 which extend across the opening in said mold core, the ends of which are embedded in or otherwise rigidly secured to the walls of said mold core.

With a mold embodying my invention and improvements the entire molding operation can be performed without inverting or otherwise changing the position of the mold, all molding operations being performed and the removal of the finished article being effected without changing the initial position of the mold, the removal of the molded article being effected by first withdrawing the mold core $a'$ and removing the upper rim portion 2 of the outer mold member and then grasping the projecting upper end of the molded article and raising it bodily out of the finished article and the lower portion of the outer mold member, all of which may be done with very little effort by a single operator and at relatively very small cost as compared with the practice prior to my invention.

It will be observed that it is important that the supplemental section 2 of the mold casing shall be held in alignment with its main, supporting section, dowel pins being employed in the present instance. Also, it will be observed that it is essential that the flange of the core member shall extend over and rest upon the removable supplemental section 2 so as to utilize the weight of the core member to hold this supplemental section in place during the molding operation and yet permit the supplemental section to be readily lifted off the main section after the core is lifted out of the mold.

I claim:

A molding apparatus embodying a three piece mold consisting of a casing consisting of a main or bottom section and a supplemental section mounted removably on the top thereof so that the supplemental section forms an upward extension of the main section, means for maintaining the supplemental section in alignment with the main section, and a core embodying a depending core member and an outwardly extending flange adapted to rest upon the top edge of said supplemental section to hold said supplemental section in place by the weight of the core.

In witness that I claim the foregoing as my invention I affix my signature this 16th day of May, A. D. 1928.

LINDON A. PERRY.